US005785887A

United States Patent [19]

Steltenkamp et al.

[11] Patent Number: 5,785,887

[45] **Date of Patent: *Jul. 28, 1998**

[54] PEROXYGEN BLEACH COMPOSITION

[75] Inventors: Robert Steltenkamp; Robert Heffner, both of Somerset, N.J.

[73] Assignee: Colgate-Palmolive Company, Piscataway, N.J.

[ * ] Notice: The term of this patent shall not extend beyond the expiration date of Pat. No. 5,512,206.

[21] Appl. No.: 841,366

[22] Filed: Feb. 20, 1996

Related U.S. Application Data

[63] Continuation-in-part of Ser. No. 249,374, May 23, 1994, Pat. No. 5,512,206, which is a continuation-in-part of Ser. No. 870,362, Apr. 17, 1992, abandoned.

[51] Int. Cl.$^{6}$ .............................. C01B 15/10; C01B 3/00; C11D 3/39; C11D 3/395

[52] U.S. Cl. ................................ 252/186.42; 252/186.26; 252/186.1; 510/309; 549/333; 549/200; 549/332

[58] Field of Search ......................... 252/186.26, 186.42, 252/186.1; 510/309, 310, 312, 367; 549/332, 333, 341, 200

[56] References Cited

U.S. PATENT DOCUMENTS

| | | | |
|---|---|---|---|
| 4,499,000 | 2/1985 | Hentschel et al. | 252/73 |
| 5,366,593 | 11/1994 | Lee et al. | 162/72 |
| 5,437,686 | 8/1995 | Heffner et al. | 8/111 |
| 5,512,206 | 4/1996 | Steltenkamp et al. | 252/186.4 |
| 5,525,121 | 6/1996 | Heffner et al. | 8/111 |
| 5,631,353 | 5/1997 | Schaap et al. | 536/4.1 |

*Primary Examiner*—Joseph D. Anthony
*Attorney, Agent, or Firm*—Richard E. Nanfeldt; James M. Serafino

[57] ABSTRACT

A peroxygen bleaching composition which comprises approximately by weight a mixture of about 1 to about 75% of an inorganic peroxygen bleaching compound; and about 1 to about 75% peroxygen ketalcycloalkanedione bleachant activator.

5 Claims, No Drawings

PEROXYGEN BLEACH COMPOSITION

RELATED APPLICATION

This application is a continuation in part application of U.S. Ser. No. 08/249,374 filed May 23, 1994 now U.S. Pat. No. 5,512,206 which in turn is a continuation in part application of U.S. Ser. No. 07/870,362 filed Apr. 17, 1992 now abandoned.

BACKGROUND OF THE INVENTION

The instant invention relates toga peroxygen bleaching composition which is activated in an aqueous solution at room temperature or higher temperatures. The peroxygen bleach composition comprises a mixture of a monopersulfate peroxygen bleaching compound and a monoketal of an alkanedione bleach activator which react together in an aqueous solution to form a dioxirane bleaching composition.

Bleaching cleaning, oxidizing and disinfectant and compositions have been used in home and industrial applications for hard surface care and fabric care.

Hypochlorite bleaches are very effective at removal of stains, when they are used in relatively high concentrations, but these hypochlorite, as well as other active chlorine bleaches, can cause rather severe damage to fabric colors as well as damaging textile fibers. Additionally, these hypochlorite liquid bleaches can present handling and packaging problems. Color and fabric damage can be minimized by the use of milder oxygen bleaches such as potassium monopersulfate; however, stain removal characteristics of these peroxygen bleaches are much less desirable than those of the harsher halogen bleaching agents. Commercial bleaching compositions which contain peroxygen bleaches commonly utilize activators; which are compounds that enhance the performance of the peroxygen bleachant. Bleaching compositions which have employed various types of bleach activators have been disclosed in: Popkin, U.S. Pat. No. 1,940,768, Dec. 26, 1933; Baevsky, U.S. Pat. No. 3,061,550, Oct. 30, 1962; Mackellar et al, U.S. Pat. No. 3,338,839, Aug. 29, 1967; and Woods, U.S. Pat. No. 3,556, 711, Jan. 19, 1971. The instantly disclosed bleachant activators represent an improvement over these previously disclosed activators for the cleaning of fabrics and hard surfaces because of the ability of the formulator to formulation bleachant compositions which are activate at room temperature while causing less damage to the fabric being cleaned.

U.S. Pat. No. 3,822,114 teaches a bleaching composition comprising a peroxygen bleaching activator and a ketone or aldehyde bleaching activator; however, U.S. Pat. No. 3,822, 114 fails to provide an effective bleaching composition which will undergo a bleaching process at room temperature. U.S. Pat. No. 3,822,114 fails to teach or recognize the unique cyclo-hexanedione monoketal as a bleachant activators of the instant invention which provide the user with the ability to effectively perform bleaching process at room temperature.

Robert W. Murray in *Chem Rev.* 1989, 89,1187–1201 teaches a formation of dioxiranes from ketones and monopersulfates which fails to teach the unique and novel monoketal cycloalkanedione bleachant activators of the instant invention which permit the use to employ at room temperature a bleaching process on a stained fabric. The peroxygen bleaching composition can be used directly in an aqueous solution to bleach a fabric or a harsh surface or in the alternative the bleaching composition can be added to a cleaning composition such as a powdered laundry detergent, a nonaqueous laundry detergent, a scouring powder, a hard surface cleaning composition, a powdered automatic dishwashing composition, a nonaqueous automatic dishwashing composition, a hair bleachant composition, a wound cleaning composition, a dental cleaning composition, a paper bleaching composition and a prespotter.

Again Waldemar Adam et al in Acc. *Chem Rev.* 1989, 22,205–211 teaches the formation of dioxiranes from monopersulfates and ketones but as in Murray he fails to realize the critical selection of a cycloalkanedione monoketal as bleachant activator.

SUMMARY OF THE INVENTION

The present invention relates to a unique and novel peroxygen bleaching composition which can also be employed as cleaning compositions, disinfectant compositions and oxidizing compositions. These compositions comprise a peroxygen bleaching compound and cycloalkanedione monoketals as bleachant activator which composition can be used to bleach or clean an article at room temperature with minimal damage to the fabric.

In light of the foregoing considerations concerning direct bleaching and dye transfer in laundering, it is an object of the instant invention to provide improved methods for enhancing peroxygen bleaching activity to provide useful peroxygen bleaching systems which are effective at room temperature or higher temperatures for fabric and hard surface cleaning both for home and industrial use.

DETAILED DESCRIPTION OF THE INVENTION

The instant invention relates to a room temperature bleaching process in an aqueous solution which process employs a peroxygen bleaching composition. The compositions can also be used as cleaning compositions, disinfectant compositions and oxidizing compositions besides bleaching compositions. The peroxygen bleachant activator combination which is the bleaching composition finds utility in a plurality of major practical areas. For example, such a system can be used alone or in combination with other optional ingredients to effectuate (1) direct bleaching of stains on fabrics; (2) removal by bleaching of stains found on hard surfaces; and (3) inhibition of the transfer to fabric articles of solubilized or suspended dyes found in fabric laundering solutions. The essential peroxygen bleach and, activator components of the instant invention are discussed in detail followed by a discussion of the use of the instant peroxygen bleach activator buffer combination in some of these areas.

The bleachant composition of the instant invention comprises a mixture of a peroxygen bleaching compound and a solid cyclohexanedione monoketal as a peroxygen bleachant activator in a weight ratio of peroxygen bleaching compound to peroxygen bleachant activator of about 1:1 to about 100:1, more preferably about 1:1 to about 50:1, and most preferably about 1:1 to about 10:1.

The principle bleaching agents utilized in the instant process and composition are inorganic peroxygen salts and organic peroxygen acids and their water soluble salts thereof. Examples of inorganic peroxygen salts include the water soluble monopersulfates and water soluble monoperoxyphosphates. Specific examples of such salts include sodium monopersulfate, potasium monopersulfate, disodium monoperphosphate and dipotassium monoperphosphate. Highly preferred peroxygen salts, i.e., those which are most highly activated by activators in the practice of the instant invention, are the sodium and potassium monopersulfates of the formulas $NaHSO_5$ and $KHSO_5$ respectively. Potassium monopersulfate is available commercially from E. I. duPont de Nemours and Company, Inc. under the tradename "Oxone". Oxone contains approximately 41.5% by weight $KHSO_5$ the balance being $KHSO_4$ and $K_2DO_4$ in about equal proportions.

Operable peroxyacids of the present invention have the general formula

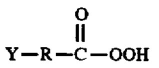

wherein R is an alkylene group containing from 1 to about 16 carbon atoms or an arylene group containing from 6 to about 8 carbon atoms and Y is hydrogen, halogen, alkyl, aryl or any group or groups, represented by:

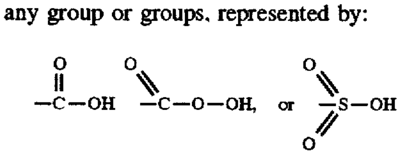

Thus the organic peroxyacids or salts thereof of the invention can contain either one or two peroxy groups and can be either aliphatic or aromatic. When the organic peroxyacid is aliphatic, the unsubstituted acid has the general formula

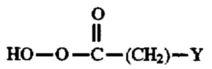

where Y, for example can be

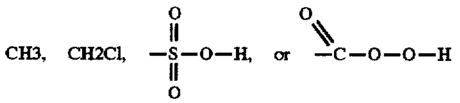

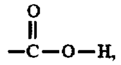

and n can be an integer from 1 to 12 with perzelaic acids (n=7) being the preferred compounds. The alkylene linkage and/or Y group (if alkyl) can contain halogen or other non-interfering substituents. Examples of preferred aliphatic peroxyacids include diperazelaic acid and diperadipic acid.

When the organic peroxyacid is aromatic, the unsubstituted acid has the general formula

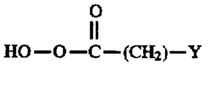

where Y is hydrogen, halogen, alkyl,

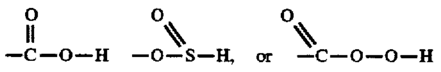

for example. The

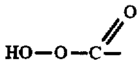

and Y groupings can be in any relative position around the aromatic ring. The ring and/or Y group (if alkyl) can contain any non-interfering substitutent such as halogen groups. Examples of suitable aromatic peroxy acids or salts thereof include monoperoxyphthalic acid, diperoxyterephthalic acid, 4-chlorodiperoxyphthalic acid. Preferred aromatic peroxyacids are m-chloroperoxybenzoic acid and p-nitroperoxybenzoic acid. A highly preferred aromatic peroxyacid is diperoxyisophthalic acid. Mixtures of the peroxygen salt compounds and the peroxyacids can be employed in the instant invention.

The concentration of the peroxygen bleaching compound in the instant composition is about 1 to about 75 wt. %, more preferably about 5 to about 60 wt. %, and most preferably about 5 to about 50 wt. %. The concentration of the peroxygen bleaching compound is of a sufficient level in the composition to provide about 1 ppm to about 1000 ppm, when the composition is contacted with and dissolved in water at room temperature or higher.

The peroxygen bleachant activator which are compounds of the instant invention are characterized by the formulas selected from the group consisting essentially of:

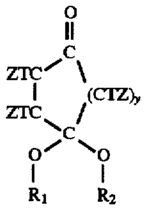

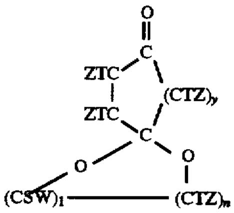

wherein structure (B) is preferred and R1 and R2 are selected independently from the group consisting of alkyl groups having about 1 to about 8 carbon atoms, more preferably about 1 to about 6 carbon atoms, halogenated alkyl groups having about 1 to about 8 carbon atoms, more preferably about 1 to about 6 carbon atoms, cycloalkyl groups having about 7 to about 12 carbon atoms, more preferably about 7 to about 10 carbon atoms, and aryl groups having about 6 to about 12 carbon atoms and mixtures thereof. T, Z, W and S are independently selected from the group consisting essentially of hydrogen, alkyl groups having about 1 to about 8 carbon atoms, more preferably about 1 to about 6 carbon atoms, halogenated alkyl groups having about 1 to about 8 carbon atoms, more preferably about 1 to 6 carbon atoms, cycloalkyl groups having about 6 to about 12 carbon atoms, arylalkyl groups having about 7 to about 12 carbon atoms, more preferably 7 to 10 carbon atoms, fluorine, chlorine and bromine and mixtures thereof. Y is 1, 2 or 3, n is about 1 to about 8, more preferably 1 to 6, r is 1 to 8, more preferably 1 to 6. Contemplated within the class of peroxygen bleachant activators are those bleachant activators that are monoketals of cycloheptanedione, monoketal of cyclohexandione and monoketal of cyclopentadione wherein the monoketal of cyclohexanedione ring structure is most preferred. The most preferred peroxygen bleachant activators are those that having a melting point of at least 25° C. at one atmospheric pressure. The more preferred peroxygen bleachant activators of the instant invention are:

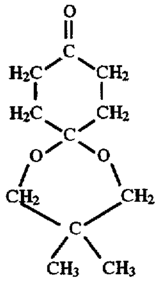

which has a melting point of 49°–50° C. and

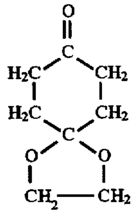

which has a melting point of 74°–76° C.

The peroxygen bleachant activators is present in the composition at a concentration of about 1 to about 75 wt. %, more preferably about 5 to about 60 wt. % and most preferably about 5 to about 50 wt. %.

Unlike the use of a chlorine containing bleach such as sodium hypochlorite bleach the reaction mechanism of the bleach system is an oxygen donating mechanism which forms a dioxirane intermediate in water, when the mixture of the bleaching compound and bleachant activator are contacted with water at room temperature or higher.

The mechanism can be generally depicted as:

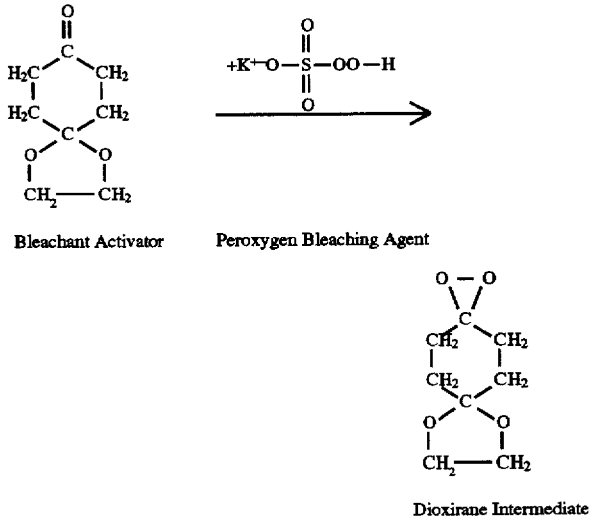

The peroxygen bleachant activators of the instant invention as previously mentioned having a melting point of at least 25 C. which permits these solid peroxygen bleachant activators unlike liquid peroxygen bleach activators to be readily post dry blended into the instant compositions. Additionally the instant peroxygen bleachant activator of the instant invention are fully activated in the present of water at room temperature or higher; resistant to hydrolysis; and are biodegradable leaving no nitrogen residue and thus are environmentally safe. The peroxygen bleaching agent reacts with the ketal type peroxygen bleachant activator upon contact with water to form the dioxirane bleaching agent in water.

The concentration of the formed dioxirane in the water is about 1 to about 1,000 parts per million (ppms), more preferably about 1 to about 500 ppms, and most preferably about 1 to about 100 ppms.

The peroxygen bleaching composition which can be used directly in water or as an additive to a fully formulated cleaning composition comprises the peroxygen bleaching compound and the peroxygen bleaching activator in a weight ratio of bleaching compound to bleachant activator of about 1:1 to about 100:1, more preferably about 1:1 to about 50:1 and most preferably about 1:1 to about 10:1. The peroxygen bleaching composition can be used as an additive to a fully formulated composition at a concentration level of about 1 to about 75 wt. %, more preferably about 5 to about 60 wt. % and most preferably about 5 to about 50 wt. % depending upon the type of cleaning composition in order to improve the storage shelf life of the peroxygen bleaching composition either the monopersulfate or the ketone bleachant activator can be encapsulated in an encapsulating member which is soluble in water at a preselected temperature depending upon the solubility of the encapsulating material in water.

A typical powdered automatic dishwashing composition of the instant invention comprises by % weight:

(a) 20 to 70% of a detergent builder salt;
(b) 5 to 40% of an alkali metal silicate;
(c) 0 to 30% of an alkali metal carbonate;
(d) 0 to 6% of an anionic or nonionic surfactant;
(e) 0 to 6% of a foam depressant;
(f) 0 to 4% of an antifilming agent selected from the group consisting essentially of silica, alumina and titanium dioxide;
(g) 0 to 20% of a low molecular polyacrylic acid;
(h) 0 to 20% of at least one enzyme;
(i) 1 to 75% of a peroxygen bleach compound; and
(j) 1 to 75% of a monoketal of cycloalkanedione bleachant activator.

A typical nonaqueous liquid automatic dishwashing composition comprises approximately by % weight:

(a) 3 to 20% of an alkali metal silicate;
(b) 0 to 15% of a clay gel thickener;
(c) 0 to 1% of a hydroxypropycellulose polymer;
(d) 0 to 25% of a low molecular weight polyacrylate polymer;
(e) 0 to 15% of a liquid nonionic surfactant;
(f) 2 to 15% of an alkali metal carbonate;
(g) 0 to 7% of a stabilizing system;
(h) 0 to 25% of an alkali metal citrate;
(i) 0 to 20% of at least one enzyme;
(j) 0 to 20% of a nonaqueous liquid carrier;
(k) 1 to 75% of a peroxygen bleaching compound; and
(l) 1 to 75% of a monoketal of cycloalkandione bleachant activator.

A typical powder detergent composition comprises approximately by % weight:

(a) 0 to 25% of at least one nonionic surfactant;
(b) 0 to 25% of at least one anionic surfactant;

(c) 0 to 40% of a zeolite;

(d) 5 to 45% of at least one builder salt;

(e) 0 to 5% of polyethylene glycol;

(f) 0 to 10% of an alkali metal silicate;

(g) 0 to 10% of a low molecular weight polyacrylate polymer;

(h) 0 to 30% of an alkali metal sulfate;

(i) 1 to 75% of a peroxygen bleachant compound; and (j) 1 to 75% of a monoketal of cycloalkanedione bleachant activator.

A typical nonaqueous laundry detergent comprises approximately by % weight:

(a) 20 to 70% of a nonionic surfactant;

(b) 0.5 to 20% of a nonaqueous solvent;

(c) 10 to 60% of at least one builder salt;

(d) 0.5% to 1.5% of a foam depressant;

(e) 1 to 75% of a peroxygen bleaching compound; and (f) 1 to 75% of a monoketal of cycloalkanedione bleachant activator.

A typical scouring composition comprises approximately by % weight:

| | |
|---|---|
| (a) White Silex | 90.85 |
| (b) Detergent | 2.0 |
| (c) Soda Ash | 6.0 |
| (d) Dioxirane Bleach System | 1.0 |
| (e) Perfume | 0.15 |

A typical nonconcentrated powdered bleach composition comprises approximately by % weight:

| | |
|---|---|
| (a) 1 to 75 | Potassium Monopersultate |
| (b) 1 to 75 | Monoketal of cyclohexanedione |
| (c) 2–10 | Sodium Carbonate (Soda Ash) |
| (d) Balance | Sodium Sulfate |
| (e) 0–10 | Enzymes |

A more detailed description of the ingredients used in the previously defined formulas is as follows:

The nonionic surfactants that can be used in the compositions are well known. A wide variety of these surfactants can be used.

The nonionic synthetic organic detergents are generally described as ethoxylated propoxylated fatty alcohols which are low-foaming surfactants and are possibly capped, characterized by the presence of an organic hydrophobic group and an organic hydrophilic group and are typically produced by the condensation of an organic aliphatic or alkyl aromatic hydrophobic compound with ethylene oxide and/or propyleneoxide (hydrophilic in nature). Practically any hydrophobic compound having a carboxy, hydroxy, amido or amino group with a free hydrogen attached to the oxygen or the nitrogen can be condensed with ethylene oxide or propylene oxide or with the polyhydration product thereof, polyethylene glycol, to form a nonionic detergent. The length of the hydrophilic or polyoxyethylene chain can be readily adjusted to achieve the desired balance between the hydrophobic and hydrophilic groups. Typical suitable nonionic surfactants are those disclosed in U.S. Pat. Nos. 4,316,812 and 3,630,929.

Preferably, the nonionic detergents that are used are the low-foaming polyalkoxylated lipophiles, wherein the desired hydrophile-lipophile balance is obtained from addition of a hydrophilic poly-lower alkoxy group to a lipophilic moiety. A preferred class of the nonionic detergent employed is the poly-lower alkoxylated higher alkanol, wherein the alkanol is of 9 to 18 carbon atoms and wherein the number of moles of lower alkylene oxide (of 2 or 3 carbon atoms) is from 3 to 15. It is preferred to employ those materials wherein the higher alkanol is a high fatty alcohol of 9 to 11 or 12 to 15 carbon atoms and which contain from 5 to 15 or 5 to 16 lower alkoxy groups per mole. Preferably, the lower alkoxy is ethoxy but in some instances, it may be desirably mixed with propoxy, the latter, if present, usually being major (more than 50%) portion. Exemplary of such compounds are those wherein the alkanol is of 12 to 15 carbon atoms and which contain about 7 ethylene oxide groups per mole.

Useful nonionics are represented by the low foam Plurafac series from BASF Chemical Company which are the reaction product of a higher linear alcohol and a mixture of ethylene and propylene oxides, containing a mixed chain of ethylene oxide and propylene oxide, terminated by a hydroxyl group. Examples include Product A(a C13–C15 fatty alcohol condensed with 6 moles ethylene oxide and 3 moles propylene oxide). Product B (a C13–C15 fatty alcohol condensed with 7 mole propylene oxide and 4 mole ethylene oxide), and Product C (a C13–C15 fatty alcohol condensed with 5 moles propylene oxide and 10 moles ethylene oxide). Particularly good surfactants are Plurafac LF132 and LF231 which are capped nonionic surfactants. Another liquid nonionic surfactant that can be used in solid under the tradename Lutensol SC 9713.

Synperionic nonionic surfactant from ICI such as Synperonic LF/D25 are especially preferred nonionic surfactants that can be used in the powdered automatic dishwasher detergent compositions of the instant invention.

Other useful surfactants are Neodol 25-7 and Neodol 23-6.5, which products are made by Shell Chemical Company, Inc. The latter is a condensation product of a mixture of higher fatty alcohols averaging about 12 to 13 carbon atoms and the number of ethylene oxide groups present averages about 6.5. The higher alcohols are primary alkanols. Other examples of such detergents include Tergitol 15-S-7 and Tergitol 15-S-9 (registered trademarks), both of which are linear secondary alcohol ethoxylates made by Union Carbide Corp. The former is mixed ethoxylation product of 11 to 15 carbon atoms linear secondary alkanol with seven moles of ethylene oxide and the latter is a similar product but with nine moles of ethylene oxide being reacted.

Also useful in the present compositions as a component of the nonionic detergent are higher molecular weight nonionics, such as Neodol 45-11, which are similar ethylene oxide condensation products of higher fatty alcohols, with the higher fatty alcohol being of 14 to 15 carbon atoms and the number of ethylene oxide groups per mole being about 11. Such products are also made by Shell Chemical Company.

In the preferred poly-lower alkoxylated higher alkanols, to obtain the best balance of hydrophilic and lipophilic moieties the number of lower alkoxies will usually be from 40% to 100% of the number of carbon atoms in the higher alcohol, preferably 40 to 60% thereof and the nonionic detergent will preferably contain at least 50% of such preferred poly-lower alkoxy higher alkanol. Glucamide surfactants can also be employed in the instant compositions.

The alkylpolysaccharides are surfactants which are also useful alone or in conjunction with the aforementioned surfactants and have those having a hydrophobic group containing from about 8 to about 20 carbon atoms, more preferably from about 10 to about 16 carbon atoms, most preferably from 12 to 14 carbon atoms, and polysaccharide hydrophilic group containing from 1.5 to about 10, preferably from about 1.5 to 4, and most preferably from 1.6 to 2.7 saccharide units (e.g. galactoside, glucoside, fructoside, glucosyl, fructosyl, and/or galactosyl units). Mixtures of saccharide moieties may be used in the alkyl polysaccharide surfactants. The number x indicates the number of saccharide units in a particular alkylpolysaccharide surfactant. For a particular alkylpolysaccharide molecule x can only assume integral values. Any physical sample can be characterized by the average value of x and this average value can assume nonintegral values. In this specification the values of x are to be understood to be average values. The hydrophobic group (R) can be attached at the 2-, 3-, or 4- positions rather than at the 1 -position, (thus giving 3.g a glucosyl or galactosyl as opposed to a glucoside or galactoside). However, attachment through the 1-position, i.e. glucosides, galactosides, fructosides, etc., is preferred. In the preferred product the additional saccharide units are predominantly attached to the previous saccharide unit's 2-position. Attachment through the 3-, 4-, and 6-positions can also occur. Optionally and less desirably there can be a polyalkoxide chain joining the hydrophobic moiety (R) and the polysaccharide chain. The preferred alkoxide moiety is ethoxide.

Typical hydrophobic groups include alkyl groups, either saturated or unsaturated, branched or unbranched containing from about 8 to about 20, preferably from about 10 to about 16 carbon atoms. Preferably, the alkyl group can contain up to 3 hydroxy groups and/or the polyalkoxide chain can contain up to about 30, preferably less than 10, most preferably 0, alkoxide moieties.

Suitable alkyl polysaccharides are decyl, dodecyl, tetradecyl, pentadecyl, hexadecyl, and octadecyl, di- tri-, tetra-, penta-, and hexaglucosides, galactosides, lactosides, fructosides, fructosyls, lactosyls, glucosyls and/or galactosyls and mixtures thereof.

The alkyl monosaccharides are relatively less soluble in water than the higher alkylpolysaccharides. When used in admixture with alkylpolysaccharides, the alkyl monosaccharides are solubilized to some extent. The use of alkyl monosaccharides in admixture with alkylpolysaccharides is a preferred mode of carrying out the invention. Suitable mixtures include coconut alkyl, di-tri-tetra-, and pentaglucosides and tallow alkyl tetra-penta-, and hexaglucosides.

The preferred alkyl polysaccharides are alkyl polyglucosides having the formula:

$$R_2O(C_nH_{2n}O)_r(Z)_x$$

wherein Z is derived from glucose, R is a hydrophobic group selected from the group consisting of alkyl, alkylphenyl, hydroxyalkylphenyl, and mixtures thereof in which said alkyl groups contain from about 10 to about 18, preferably from 12 to 14 carbon atoms; n is 2 or 3 preferably 2, r is from 0 to about 10, preferably 0; and x is from 1.5 to about 8, preferably from 1.5 to 4, most preferably from 1.6 to 2.7. To prepare these compounds a long chain alcohol ($R_2OH$) can be reacted with glucose, in the presence of an acid catalyst to form the desired glucoside. Alternatively the alkylpolyglucosides can be prepared by a two step procedure in which a short chain alcohol ($R_1OH$) can be reacted with glucose, in the presence of an acid catalyst to form the desired glucoside. Alternatively the alkylpolyglucosides can be prepared by a two step procedure in which a short chain alcohol ($C_{1-6}$) is reacted with glucose or a polyglucoside (x=2 to 4) to yield a short chain alkyl glucoside (x=1 to 4) which can in turn be reacted with a longer chain alcohol ($R_2OH$) to displace the short chain alcohol and obtain the desired alkylpolyglucoside. If this two step procedure is used, the short chain alkylglucoside content of the final alkylpolyglucoside material should be less than 50%, preferably less than 10%, more preferably less than 5%, most preferably 0% of the alkylpolyglucoside. The amount of unreacted alcohol (the free fatty alcohol content) in the desired alkylpolysaccharide surfactant is preferably less than about 2%, more preferably less than about 0.5% by weight of the total of the alkylpolysaccharide. For some it is desirable to have the alkyl monosaccharide content less than about 10%.

The used herein, "alkyl polysaccharide surfactant" is intended to represent both the preferred glucose and galactose derived surfactants and the less preferred alkyl polysaccharide surfactants. Throughout this specification, "alkyl polyglucoside" is used to include alkyl- polyglycosides because the stereo chemistry of the saccharide moiety is changed during the preparation reaction.

An especially preferred APG glycoside surfactant is APG 625 glycoside manufactured by the Henkel Corporation of Ambler, Pa. APG 25 is a nonionic alkyl polyglucoside characterized by the formula:

$$C_nH_{2n+1}O(C_6H_{10}O_5)_xH$$

wherein n=10 (2%); n=12 (65%); n=14 (21–28%); n=16 (4–8%) and n=18 (0.5%) and x (degree of polymerization) =1.6. APG 625 has: a pH of 6–8 (10% of APG 625 in distilled water); a specific gravity at 25° C. of 1.1 grams/ml; a density at 25° C. of 9.1 kgs/gallons; a calculated HLB of about 12.1 and a Brookfield viscosity at 35° C., 21 spindle, 5–10 RPM of about 3,000 to about 7,000 cps. Mixtures of two or more of the liquid nonionic surfactants can be used and in some cases advantages can be obtained by the use of such mixtures.

Other detergent active material useful in the composition are the organic anionic, amine oxide, phosphine oxide, sulphoxide or betaine water dispersible surfactant types are preferred, the first mentioned anionics being most preferred. Particularly preferred surfactants herein are the linear or branched alkali metal mono- and/or di- ($C_8$–$C_{14}$) alkyl diphenyl oxide mono- and/or di-sulphates, commercially available for example as DOWFAX (registered trademark) 3B-2 and DOWFAX 2A-1. In addition, the surfactant should be compatible with the other ingredients of the composition. Other suitable organic anionic, nonsoap surfactants include the primary alkylsulphates, alkylsulphonates, alkylarylsulphonates and sec.-alkylsulphates. Examples include sodium $C_{10}$–$C_{18}$ alkylsulphates such as sodium dodecylsulphate and sodium dodecylsulphate and sodium tallow alcoholsulphate; sodium $C_{10}$–$C_{18}$ alkanesulphonates such as sodium hexadecyl-1-sulphonate and sodium $C_{12}$–$C_{18}$ alkylbenzenesulphonates such as sodium dodecylbenzenesylphonates. The corresponding potassium salts may also be employed.

As other suitable surfactants or detergents, the amine oxide surfactants are typically of the structure $R_2R_1NO$, in which each $R_1$ represents a lower alkyl group, for instance, methyl, and $R_1$ represents a long chain alkyl group having from 8 to 22 carbon atoms, for instance a lauryl, myristyl, palmityl or cetyl group. Instead of an amine oxide, a corresponding surfactant phosphine oxide $R_2R_1PO$ or sulphoxide $RR_1SO$ can be employed. Betaine surfactants are typically of the structure $R_2R_1N^+R''COO$—, in which each R represents a lower alkylene group having from 1 to 5 carbon atoms. Specified examples of these surfactants include lauryl-dimethylamine oxide, myristyl-dimethylamine oxide, myristyl-dimethylamine oxide, the corresponding phosphine oxides and sulphoxides, and the corresponding betaines, including dodecyidimethylammonium acetate, tetradecyldiethylammonium pentanoate, hexadecyldimethylammonium hexanoate and the like. For biodegradability, the alkyl groups in these surfactants should be linear, and such compounds are preferred.

Surfactants of the foregoing type, all well known in the art, are described, for example, in U.S. Pat. Nos. 3,985,668 and 4,271,030. If chlorine bleach is not used than any of the well know low foaming nonionic surfactants such as alkoxylated fatty alcohols, e.g. mixed ethylene oxide-propylene oxide condensates of $C_8$–$C_{22}$ fatty alcohols can also be used. For lauric acid (m.p. =46° C.) an elevated temperature of about 35° C. to 50° C. can be used.

Foam inhibition is important to increase dishwasher and laundry machine efficiency and minimize destabilizing effects which might occur due to the presence of excess foam within the washer during use. Foam may be reduced by suitable selection of the type and/or amount of detergent active material, the main foam-producing component. The degree of foam is also somewhat dependent on the hardness of the wash water in the machine whereby suitable adjustment of the proportions of the builder salts such as NaTPP which has a water softening effect, may aid in providing a degree of foam inhibition. However, it is generally preferred to include a chlorine bleach stable foam depressant or inhibitor. Particularly effective are the alkyl phosphoric acid esters of the formula:

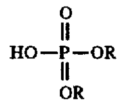

and especially the alkyl acid phosphate esters of the formula

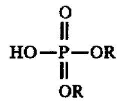

In the above formulas, one or both R groups in each type of ester may represent independently a $C_{12}$–$C_{20}$ alkyl or ethoxylated alkyl group. The ethoxylated derivatives of each type of ester, for example, the condensation products of one mole of ester with from 1 to 10 moles, preferably 2 to 6 moles, more preferably 3 or 4 moles, ethylene oxide can also be used. Some examples of the foregoing are commercially available, such as the products SAP from Hooker and LPKN-158 from Knapsack. Mixtures of the two types, or any other chlorine bleach stable types, or mixtures of mono-and di-esters of the same type, may be employed. Especially preferred is a mixture of mono- and di-$C_{16}$–$C_{18}$ alkyl acid phosphate esters such as monostearyl/distearyl acid phosphates 1.2/1, and the 3 to 4 mole ethylene oxide condensates thereof. When employed, proportions of 0 to 1.5 weight percent, preferably 0.05 to 0.5 weight percent, of foam depressant in the composition is typical, the weight ratio of detergent active component to foam depressant generally ranging from about 10:1 to 1:1 and preferably about 5:1 to 1:1. Other defoamers which may be used include, for example, the known silicones, such as available from Dow Chemicals. In addition, it is an advantageous feature of this invention that many of the stabilizing salts, such as the stearate salts, for example, aluminum stearate, when included, are also effective as foam killers.

Some specific examples of at least one alkali metal detergent builder salts used in the composition include the polyphosphates, such as alkali metal pyrophosphate, alkali metal tripolyphosphate, alkali metal metaphosphate, and the like, for example, sodium or potassium tripolyphosphate (hydrated or anhydrous), tetrasodium or tetrapotassium pyrophosphate, sodium or potassium hexa-metaphosphate, trisodium or tripotassium orthophosphate and the like, sodium or potassium carbonate, sodium or potassium citrate, sodium or potassium nitrilotriacetate, and the like. The phosphate builders, were not precluded due to local regulations, are preferred and mixtures of tetrapotassium pyrophosphate (TKPP) and sodium tripolyphosphate (NaTPP) (especially the hexahydrate) are especially preferred. Typical ratios of NaTPP to TKPP are from about 2:1 to 1:8, especially from about 1:1.1 to 1:6. The total amount of detergent builder salts is preferably from about 5 to 45% by weight, more preferably from about 15 to 35%, especially from about 18 to 30% by weight of the composition.

In connection with the builder salts are optionally used a low molecular weight noncrosslinked polyacrylates having a molecular weight,.of about 1,000 to about 100,000, more preferably about 2,000 to about 80,000. A preferred low molecular weight polyacrylate is Norasol LMW45ND manufactured by Norshohaas and having a molecular weight of about 4,500. These low molecular weight polyacrylates are employed at a concentration of about 0 to 15 wt. %, more preferably 0.1 to 10 wt. %.

Other useful low molecular weight noncrosslinked polymers are Acusol™ 640D provided by Rohm & Haas and Norasol QR1014 from Norshohaas having a GPC molecular weight of 10,000.

The composition can contain a nonphosphate builder system which comprises a mixture of phosphate free particles which is a builder salt and a low molecular weight polyacrylate. A preferred solid builder salt is an alkali metal carbonate such as sodium carbonate or sodium citrate or a mixture of sodium carbonate and sodium citrate. When a mixture of sodium carbonate and sodium citrate is used, a weight ratio of sodium carbonate to sodium citrate is about 9:1 to about 1:9, more preferably about 3:1 to about 1:3.

Other builder salts which can be mixed with the sodium carbonate and/or sodium citrate are gluconates, phosphonates, and nitriloacetic acid salts. In conjunction with the builder salts are optionally used low molecular weight polyacrylates having a molecular weight of about 1,000 to about 100,000, more preferably about 2,000 to about 80,000. Preferred low molecular weight polyacrylate are Sokalan™ CP45 and Sokalan™ CP5 manufactured by BASF and having a molecular weight of about 70,000. Another preferred low molecular weight polyacrylate is Acrysol™ LMW45ND manufactured by Rohm and Haas and having a molecular weight of about 4,500.

Sokalan™ CP45 is a copolymer of a polyacid and an acid anhydride. Such a material should have a water absorption at 38° C. and 78 percent relative humidity of less than about 40 percent and preferably less than about 30 percent. The builder is commercially available under the tradename of Sokalan™ CP45. This is a partially neutralized copolymer of methacrylic acid and maleic acid anhydride. Sokalan™ CP5 is the totally neutralized copolymer of methacrylic acid and maleic acid anhydride. Sokalan™ CP45 is classified as a suspending and antideposition agent. This suspending agent has a low hygroscopicity as a result of a decreased dydroxyl group content. An objective is to use suspending and antiredeposition agents that have a low hygroscopicity. Copolymerized polyacids have this property, and particularly when partially neutralized. Acusol™ 640ND provided by Rohm & Haas is another useful suspending and antiredeposition agent. Another builder is Sokalan™ 9786X which is a copolymer of silicates) are described in British Patent No. 1,504,168; U.S. Pat. No. 4,409,136 and Canadian Patent Nos. 1,072,835 and 1,087,477. An example of amorphous zeolites useful herein can be found in Belgium Patent No. 835,351. The zeolites generally have the formula:

$$(M_2O)x(Al_2O_3)y(SiO_2)zWH_2O$$

wherein x is 1, y is from 0.8 to 1.2 and preferably 1, z is from 1.5 to 3.5 or higher and preferably 2 to 3 and w is from 0 to 9, preferably 2.5 to 6 and M is preferably sodium. A typical zeolite is type A or similar structure, with type 4A particularly preferred. The preferred alumino silicates have calcium ion exchange capacities of about 200 milliequivalents per gram or greater, e.g. 400 meg/g.

The alkali metal silicates are useful anti-corrosion agents which function to make the composition anti-corrosive to eating utensils and to automatic dishwashing machine parts. Sodium silicates of $Na_2O/SiO_2$ ratios of from 1:1 to 1:3.4 especially about 1:2 to 1:3 are preferred. Potassium silicates of the same ratios can also be used. The preferred silicates are sodium disilicate (hydrated or anhydrous) and sodium metasilicate.

The thickening agents that can be used to ensure the physical stability of the suspension and viscosity enhancement are those that will swell and develop thixotropic properties in a nonaqueous environment. These include organic polymeric materials and inorganic and organic modified clays. Essentially, any clay can be used as long as it will swell in a nonaqueous medium and develop thixotropic properties. A preferred clay is bentonite. A swelling agent is used with the bentonite clay. The preferred swelling agent is a combination of propylene carbonate and tripropylene glycol methyl ether. However, any other substance that will cause bentonite to swell in a nonaqueous environment and thus develop thixotropic properties can be used.

The nonaqueous liquid carrier materials that can be used for the nonaqueous liquid compositions include the higher glycols, polyglycols, polyoxides and glycol ethers. Suitable substances are propylene glycol, polyethylene glycol, polypropylene glycol, diethylene glycol monethyl ether, diethylene glycol monopropyl ether, diethylene glycol monobutyl ether, tripropylene glycol methyl ether, propylene glycol methyl ether (PM), dipropylene glycol methyl ether (DPM), propylene glycol methyl ether acetate (PMA), dipropylene glycol methyl ether acetate (DPMA), ethylene glycol n-butyl ether and ethylene glycol n-propyl ether and mixtures thereof. A preferred nonaqueous carrier of the instant invention is polyethylene glycol 200 (PEG200) or polyethylene glycol 300 (PEG300).

Other useful solvents are ethylene oxide/propylene oxide, liquid random copolymer such as Synalox solvent series from Dow Chemical (e.g. Synalox 50-50B). Other suitable solvents are propylene glycol ethers such as PnB, DPnB and TPnB (propylene glycol mono n-butyl ether, dipropylene glycol and tripropylene glycol mono-n-butyl ethers) sold by Dow Chemical under the tradename Dowanol. Also tripropylene glycol mono methyl ether "TPM Dowanol" from Dow Chemical is suitable. Another useful series of solvents are supplied by CCA biochem of Holland such as Plurasolv®L, Plurasolv®LS(s), Plurasolv®EL, Plurasolv®IPL and Plurasolv®BI.

Mixtures of PEG solvent with Synalox or PnB, DPnB, TPnB and TPM solvents are also useful. Preferred mixtures are PEG 300/Synalox 50-50B and PEG 300/TPnB in weight ratios of about 95:5 to 20:80, more preferably of about 90:10 to 50:50. EP/PO capped nonionic surfactants can be used as a liquid solvent carrier and an example of such a nonionic surfactant is Plurafac LF/132 sold by BASF.

The system used in the instant compositions to ensure phase stability (stabilizing system) can comprise a finely divided silica such as Cab-O-Sil M5, Cab-O-Sil M5, Cab-O-Sil EH5, Cab-O-Sil TS720 or Aerosil 200 which are used as a concentration level of about 0 to about 4.0 weight percent, more preferably about 0.5 to about 3.0 weight %. Also employed as a stabilizing system are mixtures of finely divided silica such as Cab-O-Sil and nonionic associative thickeners such as Dapral T210, T212 (Akzo) which are low molecular weight dialkyl polyglycol ethers with a dumbbell-like structure or pluracol TH 916 and Th 922 (BASF) associative thickeners having star-like structure with a hydrophilic core and hydrophobic tail. These thickeners are used at concentration levels of about 0 to about 5.0 weight percent together with about 0 to about 2.0 weight percent of finely divided silica. Another useful stabilizing systems are blends of organoclay gel and hydroxypropyl cellulose polymer (HPC). A suitable organoclay is Bentone NL27 sold by NL Chemical. A suitable cellulose polymer is Klucel M cellulose having a molecular weight of about 1,000,000 and is sold by Aqualon Company. Bentone gel contains 9 percent Bentone NL 27 powder (100 percent active), 88 percent TPM solvent (tripropylene glycol mono methyl ether) and 3 percent propylene carbonate (polar additive). The organic modified clay thickener gels are used at concentration levels of about 0.0 weight percent to about 15 weight percent in conjunction with Klucel M at concentration levels of about 0 to about 0.6 weight percent, more preferably about 0.2 weight percent to about 0.4 weight percent. Another useful thickening agent is a high molecular weight long chain alcohol such as Unilin™ 425 sold by Petrolite Corp.

The detergent formulation can also contain a mixture of a proteolytic enzyme and an amylotytic enzyme and optionally, a lipolytic enzyme that serves to attack and remove organic residues on glasses, plates, pots, pans and eating utensils. Proteolytic enzymes attack protein residues, lipolytic enzymes fat residues and amylotytic enzymes starches. Proteolytic enzymes include the protease enzymes subtilism, bromelin, papain, trypsin and pepsin. Amylolytic enzymes include amylase enzymes. Lipolytic enzymes include the lipase enzymes. The preferred amylase enzyme is available under the name Maxamyl, derived from Bacillus licheniformis and is available from Gist-Brocades of the Netherlands in the form of a nonaqueous slurry (18 wt. % of enzyme) having an activity of about 40,000 TAU/g. The preferred protease enzyme is available under the name Maxatase derived from a novel Bacillus strain designated "PB92" wherein a culture of the Bacillus is deposited with the Laboratory for microbiology of the Technical University of Delft and has the number OR-60, and is supplied by Gist-Borcades, of the Netherlands in a nonaqueous slurry (22 wt. % of enzyme/activity of about 400,000 DU/g). Preferred enzyme activities per wash are Maxatase-100-800 KDU per wash and Maxamyl 1-1,000-8,000 TAU per wash.

The weight ratio of the slurry of the proteolytic enzyme to the amylolytic in the nonaqueous liquid automatic dishwasher detergent compositions is about 25:1 to about 1:1, and more preferably about 15:1 to about 1.5:1.

Other conventional ingredients may be included in these compositions in small amounts, generally less than about 3 weight percent, such as perfume, hydrotropic agents such as the sodium benzene, toluene, xylene and cumene sulphonates, perservatives, dyestuffs and pigments and the like, all of course being stable to chlorine bleach compound and high alkalinity. Especially preferred for coloring are the chlorinated phythalocyanines and polysuphides of aluminosilicate which provide, respectively, pleasing green and blue tints. $TiO_2$ may be employed for whitening or neutralizing off-shades.

The invention may be put into practice in various ways and a number of specific embodiments will be described to illustrate the invention with reference to the accompany examples.

EXAMPLE

A solution of 0.35 grams of potassium monopersulfate Oxone or 3.5 grams of sodium monoperborate and 1.0 grams of Ajax detergent in one liter of water was prepared and to the solution of the Oxone or perborate and Ajax was added 0.1 grams of various organic compounds having a carbonyl moiety to test these compounds as bleachant activators.

TABLE 1

Test Organic Compounds containing carbonyl moiety

| | % Soil Removal |
|---|---|
| 1. 8-Hydroxyquinone and oxone | 15 |
| 2. Methyl pyruvate and oxone | 24 |
| 3. 1,4 Cyclohexanedione and oxone | 24 ± 1 |
| 4. 1,1-N,N-Dimethyl-4-oxopiperdinium Nitrate and oxone | 24 ± 1 |
| 5. Ethyl levulinate and oxone | 33 |
| 6. Oxone (no organic compound) | 34 ± 4 |
| 7. Cyclohexanone (Bisulfite Additive) and oxone | 34 |
| 8. 2 Methylcyclohexanone and oxone | 39 |
| 9. Acetone and oxone | 47 |
| 10. 4-t-Butylcyclohexanone and oxone | 51 |
| 11. Cyclohexanone and oxone | 56 ± 4 |
| 12. 1,4-Cyclohexanedione, mono-ethylene ketal, and oxone | 65 ± 2 |
| 13. 1,4-Cyclohexanedione, mono 2,2-dimethyl-trimethylene ketal and oxone | 64 ± 4 |
| 14. Sodium nonyloxybenzene sulfonate (SNOBS) and perborate | 40 to 52% |
| 15. Nonyloxyglyolic phenyl sulfonate and perborate | 40 to 49% |
| 16. Benzyloxybenzene sulfonate (BOBS) and perborate | 40 to 46% |
| 17. Tetraacetylethylenidiamine (TAED) and perborate | 32 to 38% |
| 18. Ajax (alone - no organic compound; and perborate no oxone | 15 to 20% |

[1]The percent soil removal was tested as follows.

Bleaching tests were performed in a six bucket (1 liter) terg-o-tometer at 80° F. Tests were run in tap water and Ajax base beads (1 gm) were used in conjunction with the bleaching system which also acted as a control.

Dioxiranes were generated in situ by the addition of Oxone (0.35 gms) and a ketone (0.10 gms) to the 1 liter terg-o-tometer bucket which contained the Ajax base beads. After 30 seconds of agitation of the above solution, the stained swatches were added to the terg solution and agitation was continued for 15 minutes. The stains were then rinsed in tap water, dried and their reflectance measured on a reflectometer to determine (% Average Soil Removal) (%ASR).

The following four stained swatches were evaluated for bleaching in the test:

Grape juice on dacron (65)/cotton(35)

Blueberry pie on cotton percale

Red wine-114

Instant coffee on cotton percale

Determining the % Average Soil Removal:

The % Average Soil Removal (%ASR) value is calculated by averaging the individual % Soil Removal (%SR) values of the four stains evaluated. The (%SR) of a stained swatch is determined by manipulating its reflectance values which are measured from the swatch both before and after washing. A reflectance value is the amount of light that a surface such as a swatch will reflect. The following example will illustrate this protocol. Red win (EMPA-114) stained swatches were bleached inthe Dioxirane system (Cyclohexanone-measured reflectance values of the swatches without stain) (No Soil), with the stain (Soiled), and after washing (Washed). For each stain there are two swatches evaluated in order that there by an average value calculated.

TABLE 4

Average of the Measured Values

| Stain | Fabric | No Soil | Soiled | Washed | % SR |
|---|---|---|---|---|---|
| Red Wine (Empa-114) | Heavy Cotton | 92.00 | 44.19 | 63.00 | 39.34 |

The %SR value for the red wine stained swatch is calculated by plugging the average of the measured reflectance values into the equation presented in Scheme 1.

Scheme 1

$$\% SR = \frac{(\text{Washed} - \text{Soiled})}{(\text{No Soil} - \text{Soiled})} = \frac{(63.00 - 44.19)}{(92.00 - 44.19)} = 39.34$$

Scheme 1: The equation for calculating the % Soil Removal values.

The %SR Value for the red wine stained swatch is 39.34. To obtain the %ASR value, the individual %SR value of all four stains are added up and the sum is divided by four (Scheme 2).

| | Grape Juice Blue-berry | | Red Wine Empa-114 | Coffee/ Tea | |
|---|---|---|---|---|---|
| System | % SR | Pie % SR | % SR | % SR | % ASR |
| Cyclo/ Oxone | 69.57 | 61.60 | 39.34 | 60.77 | 57.82 |

Example II

The bleaching efficacy of 1,4 Cyclohexanedione mono-ethylene ketal "CDEK" was evaluated at different concentrations in order to determine the minimum value for an acceptable bleaching level. A concentration of 50 ppm CDEK exhibited bleaching efficacy that is equivalent to the 100 and 150 ppm levels. The only stain that does not exhibit equivalent bleaching efficacy is blueberry pie on cotton percale, however there is not a noticeable visual difference.

A comparison of % Soil Removal Values at different concentrations of CDEK at T = 80° F.

| System | Grape Juice (65D/35C) | Blueberry (Cotton Per) | Red Wine Empa-114 (Heavy Cotton | Coffee/Tea (Cotton Per) | Avg. of 4 Stains |
|---|---|---|---|---|---|
| CDEK (150 ppm) | 73 ± 1 | 74 ± 2 | 49 ± 1 | 75 ± 2 | 68 ± 1 |
| CDEK (100 ppm) | 74 ± 2 | 74 ± 2 | 51 ± 2 | 77 ± 6 | 69 ± 1 |
| CDEK (50 ppm) | 72 ± 1 | 71 ± 1 | 52 ± 1 | 77 ± 7 | 68 ± 2 |

-continued

A comparison of % Soil Removal Values at different concentrations of CDEK at T = 80° F.

| System | Grape Juice (65D/35C) | Blueberry (Cotton Per) | Red Wine Empa-114 (Heavy Cotton | Coffee/Tea (Cotton Per) | Avg. of 4 Stains |
|---|---|---|---|---|---|
| CDEK (25 ppm) | 63 ± 4 | 60 ± 6 | 49 ± 3 | 69 ± 4 | 60 ± 2 |
| Oxone | 43 ± 1 | 33 ± 2 | 46 ± 2 | 38 ± 5 | 40 ± 1 |
| Ajax BB | 32 ± 3 | 26 ± 7 | 27 ± 1 | 16 ± 8 | 25 ± 2 |

Ajax (1000 ppm, or 1 gm/1), Oxone (350 ppm, or 0.35 mg/1).

What is claimed is:

1. A solution which comprises approximately by weight:

(a) water; and (b) about 10 to about 1000 ppms of a bleaching agent characterized by the formulas:

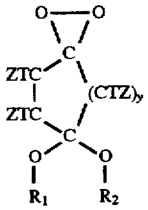

or

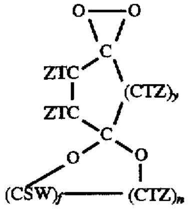

wherein y is 1, 2 or 3, n is 1 to 10, r is 1 to 8, T, W, S and Z are independently selected from the group consisting of hydrogen, an alkyl group having about 1 to about 8 carbon atoms, a halogenated alkyl group having about 1 to about 8 carbon atoms, fluorine, chlorine, bromine, an alkylaryl group having about 7 to 12 carbon atoms and mixtures thereof and R1 and R2 are selected independently from the group consisting of alkyl groups having about 1 to about 8 carbon atoms, halogenated alkyl groups having about 1 to about 8 carbon atoms, cycloalkyl groups having about 5 to about 8 carbon atoms, aryl groups having about 6 to about 12 carbon atoms and alkylaryl groups having about 7 to about 12 carbon atoms.

2. A solution according to claim 1 wherein T, Z, W and S are hydrogen, y=2 and n equals 2 to 6.

3. A solution according to claim 1 wherein T, Z, W and S are hydrogen, y is 2, n is 2 to 6, W and S are independently selected from the group consisting of hydrogen and an alkyl group having 1 to about 3 carbon atoms and r is equal to 1 to 4.

4. A solution according to claim 1 further including at least one ingredient selected from the group consisting of a nonaqueous liquid carrier, a surfactant, an antifoam agent, a thickener, a fabric softener agent, an antistatic agent, a stabilizer, an inorganic builder salt, an enzyme and an alkali metal silicate and mixtures thereof.

5. A solution according to claim 1 further including at least one ingredient selected from the group consisting of a surfactant, an antifoam agent, a fabric softener agent, an antistatic agent, a stabilizer, an inorganic builder salt, an enzyme, and an alkali metal silicate and mixtures thereof.

* * * * *